US012811330B2

(12) United States Patent
Tang

(10) Patent No.: US 12,811,330 B2
(45) Date of Patent: Nov. 24, 2026

(54) CONNECTOR HAVING AT LEAST TWO CABLES STAGGERINGLY ARRANGED WITH EACH OTHER AND CONNECTOR ASSEMBLY HAVING AT LEAST TWO CABLES STAGGERINGLY ARRANGED WITH EACH OTHER

(71) Applicant: Bellwether Electronic (Kunshan) Co., Ltd, Kunshan City (CN)

(72) Inventor: Xiang-Biao Tang, Kunshan City (CN)

(73) Assignee: Bellwether Electronic (Kunshan) Co., Ltd, Kunshan City (CN)

( * ) Notice: Subject to any disclaimer, the term of this patent is extended or adjusted under 35 U.S.C. 154(b) by 349 days.

(21) Appl. No.: 18/665,529

(22) Filed: May 15, 2024

(65) Prior Publication Data

US 2025/0219313 A1 Jul. 3, 2025

(30) Foreign Application Priority Data

Dec. 27, 2023 (CN) ......................... 202311823993.8

(51) Int. Cl.
*H01R 13/422* (2006.01)

(52) U.S. Cl.
CPC .................................. *H01R 13/422* (2013.01)

(58) Field of Classification Search
None
See application file for complete search history.

(56) References Cited

U.S. PATENT DOCUMENTS

| | | | | |
|---|---|---|---|---|
| 3,284,754 A * | 11/1966 | Buchanan | H01R 31/02 439/436 |
| 7,059,892 B1 * | 6/2006 | Trout | H01R 13/5812 439/942 |
| 8,366,458 B2 * | 2/2013 | Ngo | H01R 12/727 439/79 |
| 10,424,878 B2 * | 9/2019 | Lloyd | H01R 12/716 |
| 2016/0104956 A1 * | 4/2016 | Santos | H01R 13/2414 439/86 |

FOREIGN PATENT DOCUMENTS

| | | | |
|---|---|---|---|
| CN | 203386979 U | 1/2014 | |
| CN | 112928550 A * | 6/2021 | H01R 13/6581 |

* cited by examiner

*Primary Examiner* — Tho D Ta
(74) *Attorney, Agent, or Firm* — Li & Cai Intellectual Property Office

(57) ABSTRACT

A connector and a connector assembly are provided. The connector includes an insulating body, at least one connection terminal assembly, and at least two cables. The insulating body includes at least one terminal slot and at least one connection opening. The connection opening is arranged on a docking end of the insulating body, the terminal slot is arranged in the insulating body, and the terminal slot is in spatial communication with the connection opening. The connection terminal assembly includes two conductive components. The two conductive components are disposed in the terminal slot. The two cables are electrically connected to the two conductive components, respectively, and the two cables are staggeringly arranged with each other.

9 Claims, 18 Drawing Sheets

CONNECTOR HAVING AT LEAST TWO CABLES STAGGERINGLY ARRANGED WITH EACH OTHER AND CONNECTOR ASSEMBLY HAVING AT LEAST TWO CABLES STAGGERINGLY ARRANGED WITH EACH OTHER

CROSS-REFERENCE TO RELATED PATENT APPLICATION

This application claims the benefit of priority to China Patent Application No. 202311823993.8, filed on Dec. 27, 2023, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a connector and a connector assembly, and more particularly to a connector and a connector assembly suitable for transmitting a large current.

BACKGROUND OF THE DISCLOSURE

As the energy consumption of the servers increases, the current that the conventional connector needs to transmit also increases. Accordingly, the conventional connector still has room for improvement in its current carrying capacity and heat dissipation.

SUMMARY OF THE DISCLOSURE

In response to the above-referenced technical inadequacies, the present disclosure provides a connector and a connector assembly for improving on the issue associated with current capacity and heat dissipation of the conventional connectors applied in a server.

In order to solve the above-mentioned problems, one of the technical aspects adopted by the present disclosure is to provide a connector. The connector includes an insulating body, at least one connection terminal assembly, and at least two cables. The insulating body includes at least one terminal slot and at least one connection opening. The at least one connection opening is arranged on a docking end of the insulating body, the at least one terminal slot is arranged in the insulating body, and the at least one terminal slot is in spatial communication with the at least one connection opening. The at least one connection terminal assembly includes two conductive components. The two conductive components are disposed in the at least one terminal slot. The at least two cables are electrically connected to the two conductive components, respectively, and the at least two cables are staggeringly arranged with each other.

In order to solve the above-mentioned problems, another one of the technical aspects adopted by the present disclosure is to provide a connector assembly. The connector assembly includes an insulating body and at least one docking terminal assembly. The insulating body includes a terminal slot. The at least one docking terminal assembly includes two docking conductive sheets. One end of each of the two docking conductive sheets has a plurality of elastic arms arranged in the terminal slot. The elastic arms of the two docking conductive sheets of the at least one docking terminal assembly face toward each other, a tail end of each of the elastic arms has a protrusion and a notch, and each of the protrusions of any one of the elastic arms faces toward the notch of another one of the elastic arms.

Therefore, in the connector and the connector assembly provided by the present disclosure, through a design of the insulating body and the conductive components, a heat-dissipation gap is formed between the two cables of the conductive components, and the heat dissipation effect of the connector can be greatly improved, thereby effectively improving the current carrying capacity of the connector.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
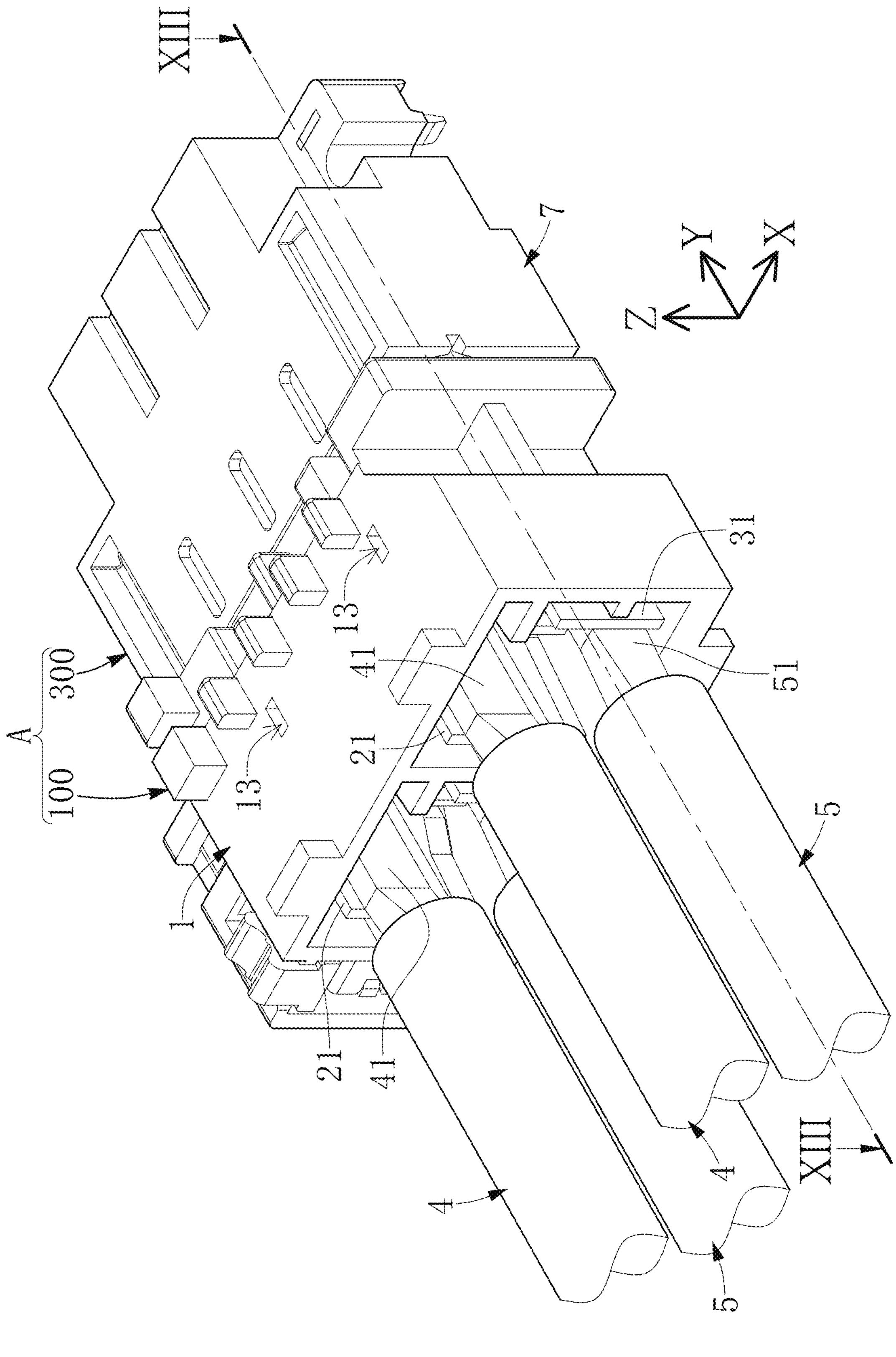
FIG. 1 is a schematic view of a connector and a docking connector mated with each other according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
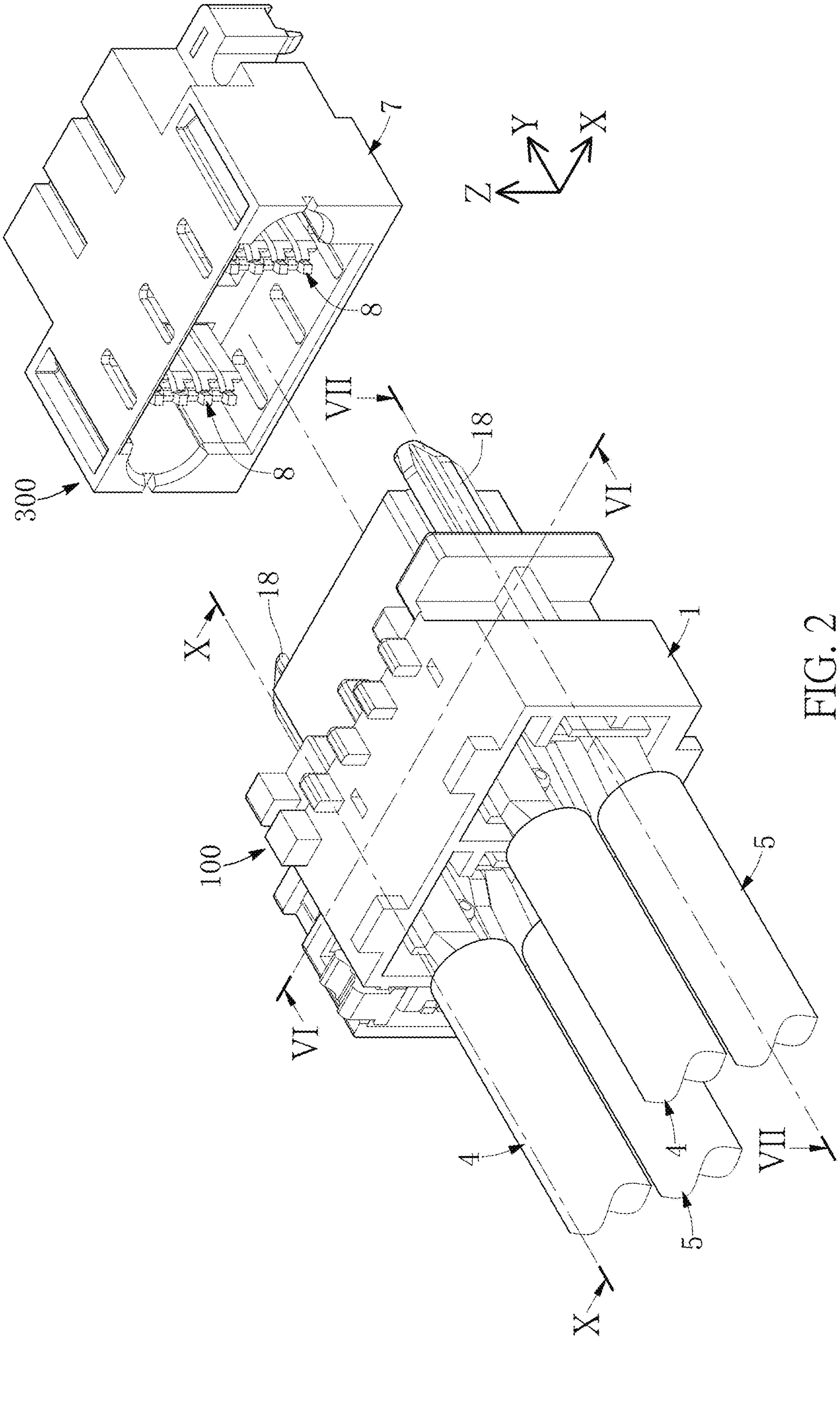
FIG. 2 and FIG. 3 are schematic exploded views of the connector and the docking connector separated from each other from different angles of view according to a first embodiment of the present disclosure.
Figure 3:
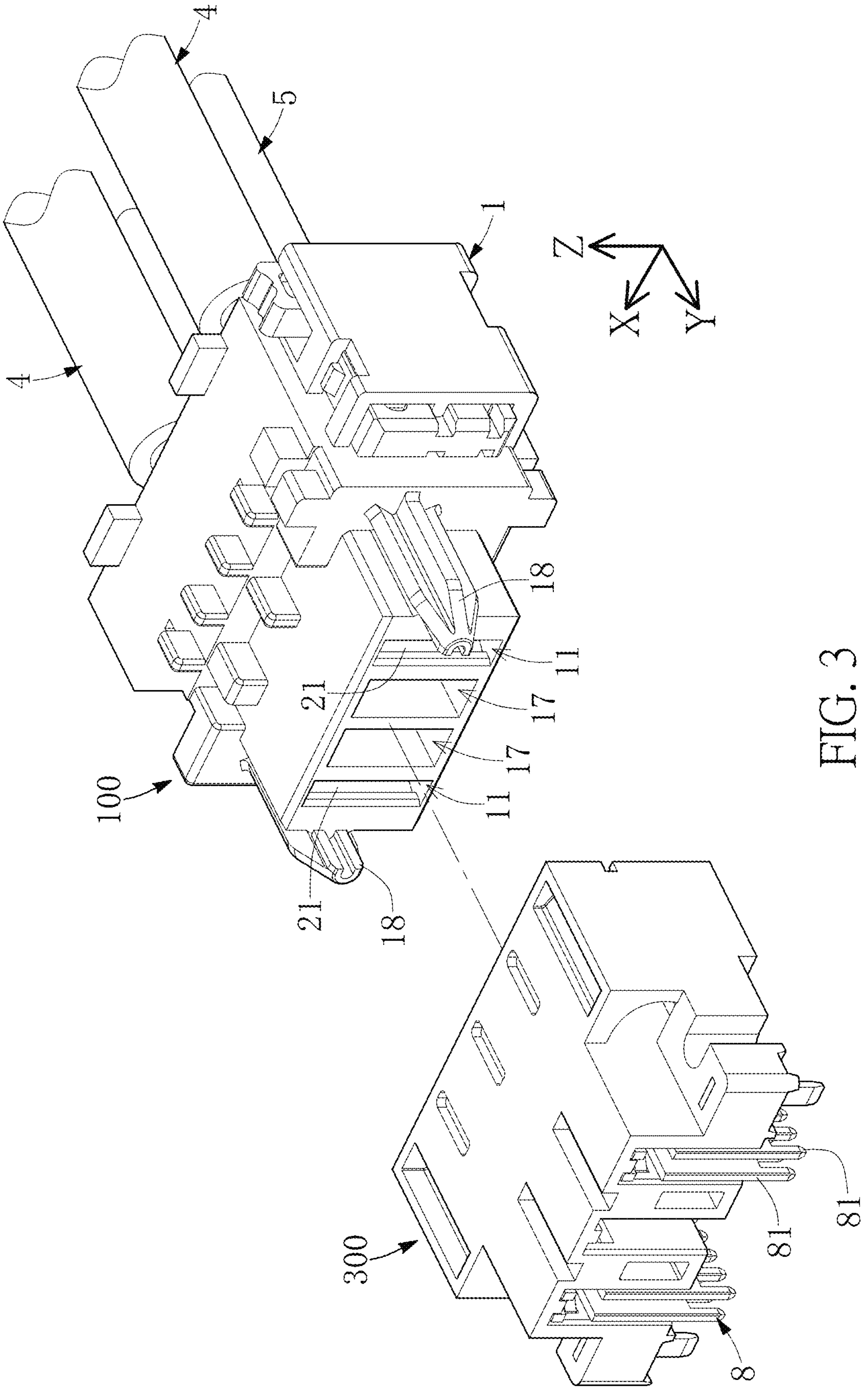
Figure 4:
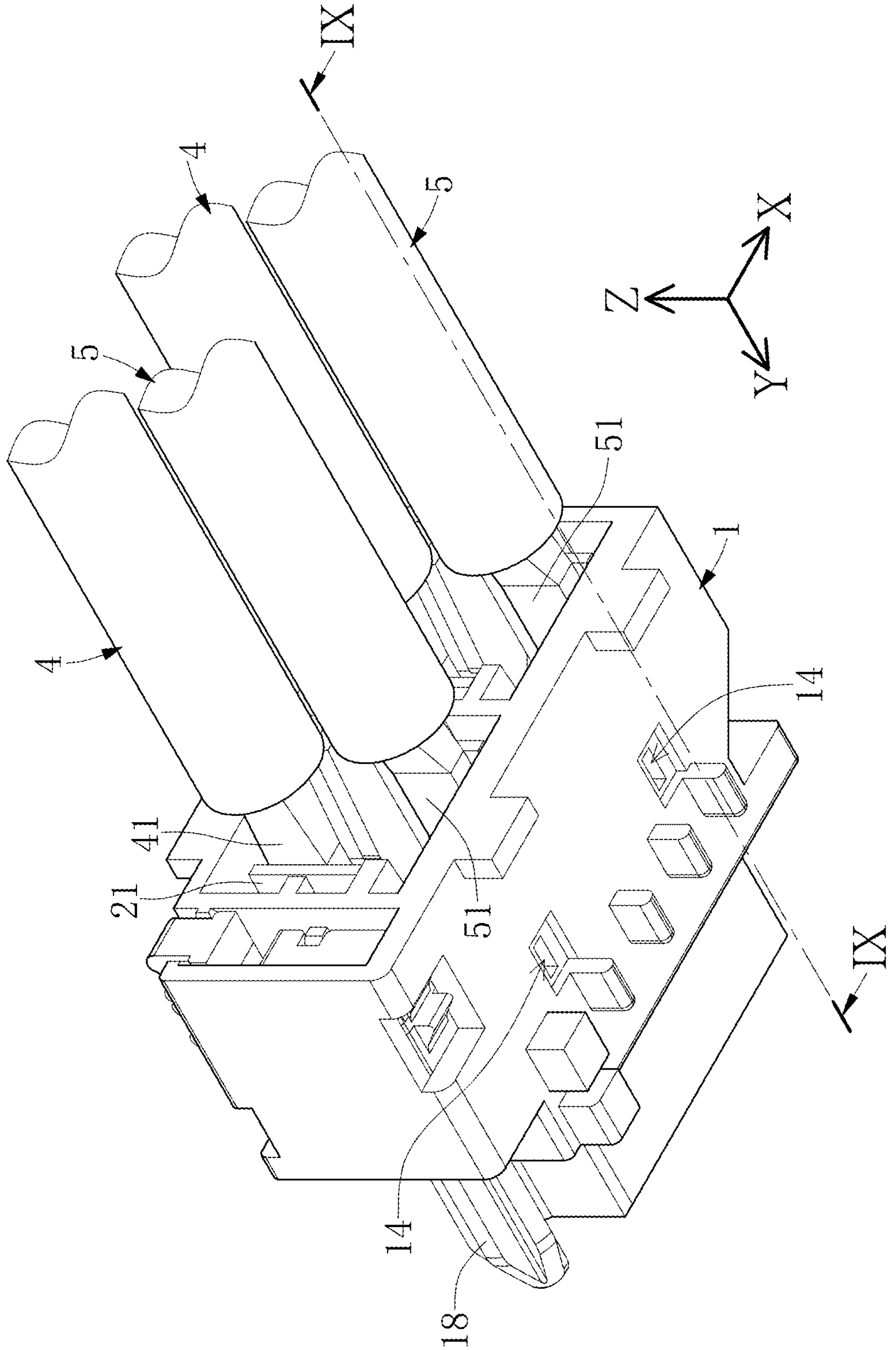
FIG. 4 is a schematic view of the connector from another angle of view according to the first embodiment of the present disclosure.
Figure 5:
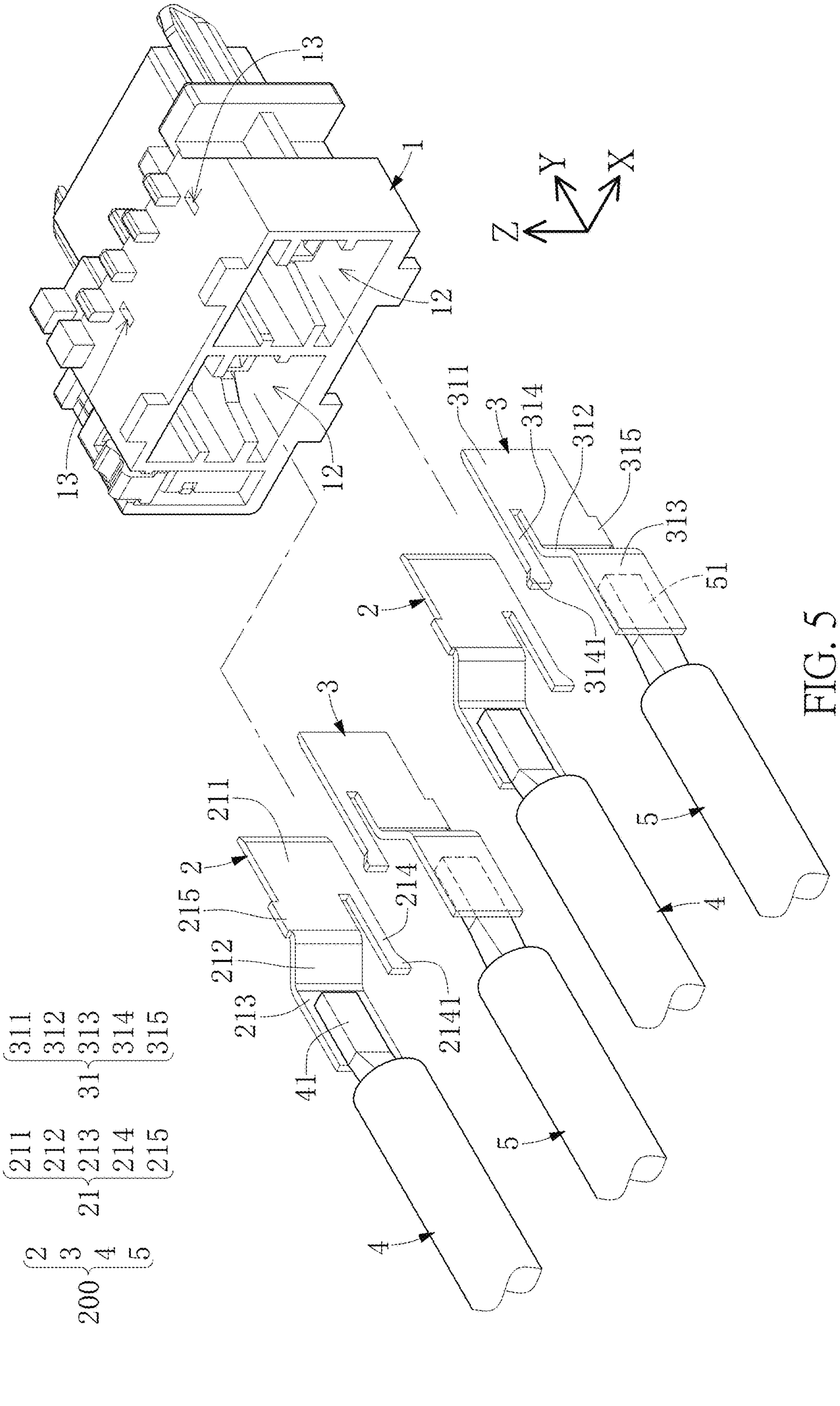
FIG. 5 is a schematic exploded view of the connector according to the first embodiment of the present disclosure.

Referring to FIG. 1 to FIG. 5, FIG. 1 is a schematic view of a connector and a docking connector mated with each other according to the present disclosure, FIG. 2 and FIG. 3 are schematic exploded views of the connector and the docking connector separated from each other from different angles of view according to a first embodiment of the present disclosure, FIG. 4 is a schematic view of the connector from another angle of view according to the first embodiment of the present disclosure, and FIG. 5 is a schematic exploded view of the connector according to the first embodiment of the present disclosure.

In the present embodiment, a connector assembly A includes a connector 100 and a docking connector 300. The connector 100 and the docking connector 300 can be plugged into each other. The connector assembly A can be applied in a server, and the connector assembly A can be configured to transmit a high-current electricity.

The connector 100 is a cable connector including an insulating body 1 and two connection terminal assemblies 200. The insulating body 1 includes at least one terminal slot 12. In the present embodiment, a quantity of the at least one terminal slot 12 may be multiple. Each of the terminal slots 12 has a connection opening 11 arranged in a docking end of the insulating body 1. The connection opening 11 has a rectangular shape. Long sides of the connection openings 11 of the terminal slots 12 face toward each other, so that the openings 11 are arranged in a row, thereby enabling the connection openings 11 to jointly define a docking interface. In the present embodiment, the insulating body 1 further has at least one channel 17 arranged between adjacent two of the connection openings 11 for heat convection. The insulating body 1 includes two guide columns 18 that are respectively arranged at two sides of the docking interface and that are configured to guide the docking connector 300 when the connector 100 docks with the docking connector 300. The guide column 18 is a combination of sheet-like structures, and the guiding column 18 is substantially arc-shaped.

Figure 6:
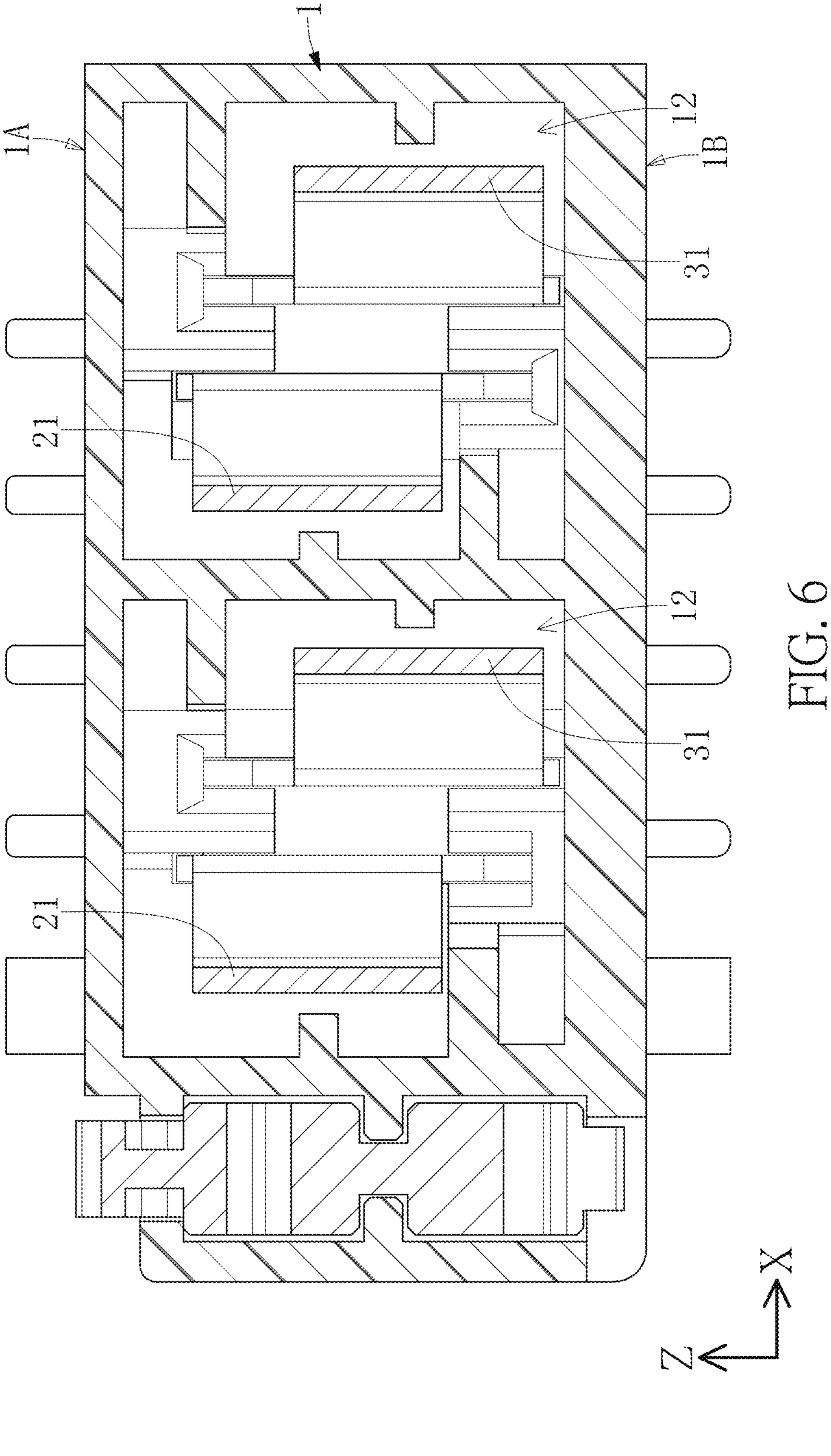
FIG. 6 is a schematic cross-sectional view taken along line VI-VI of FIG. 2.
Figure 7:
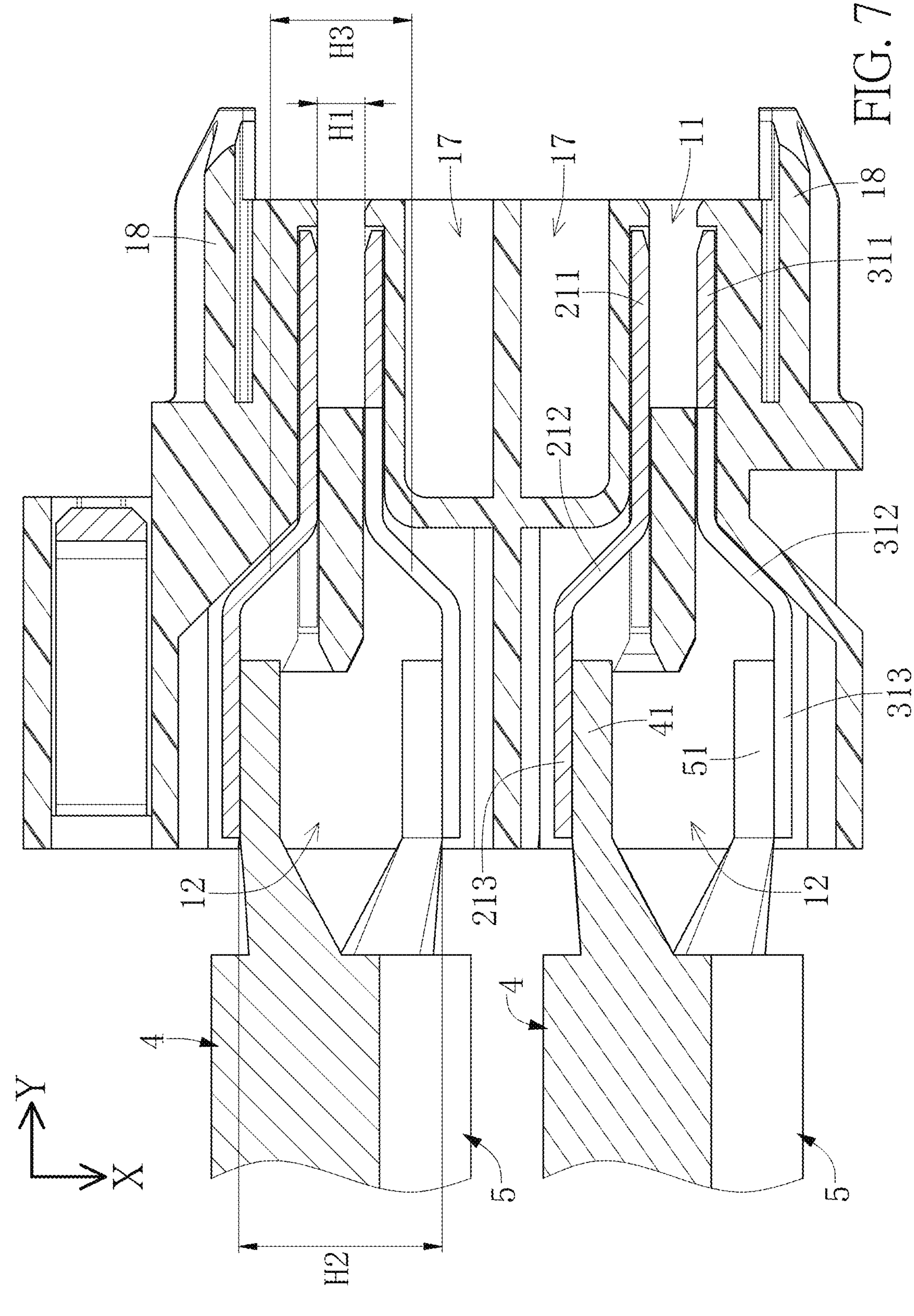
FIG. 7 is a schematic cross-sectional view taken along line VII-VII of FIG. 2.
Figure 8:
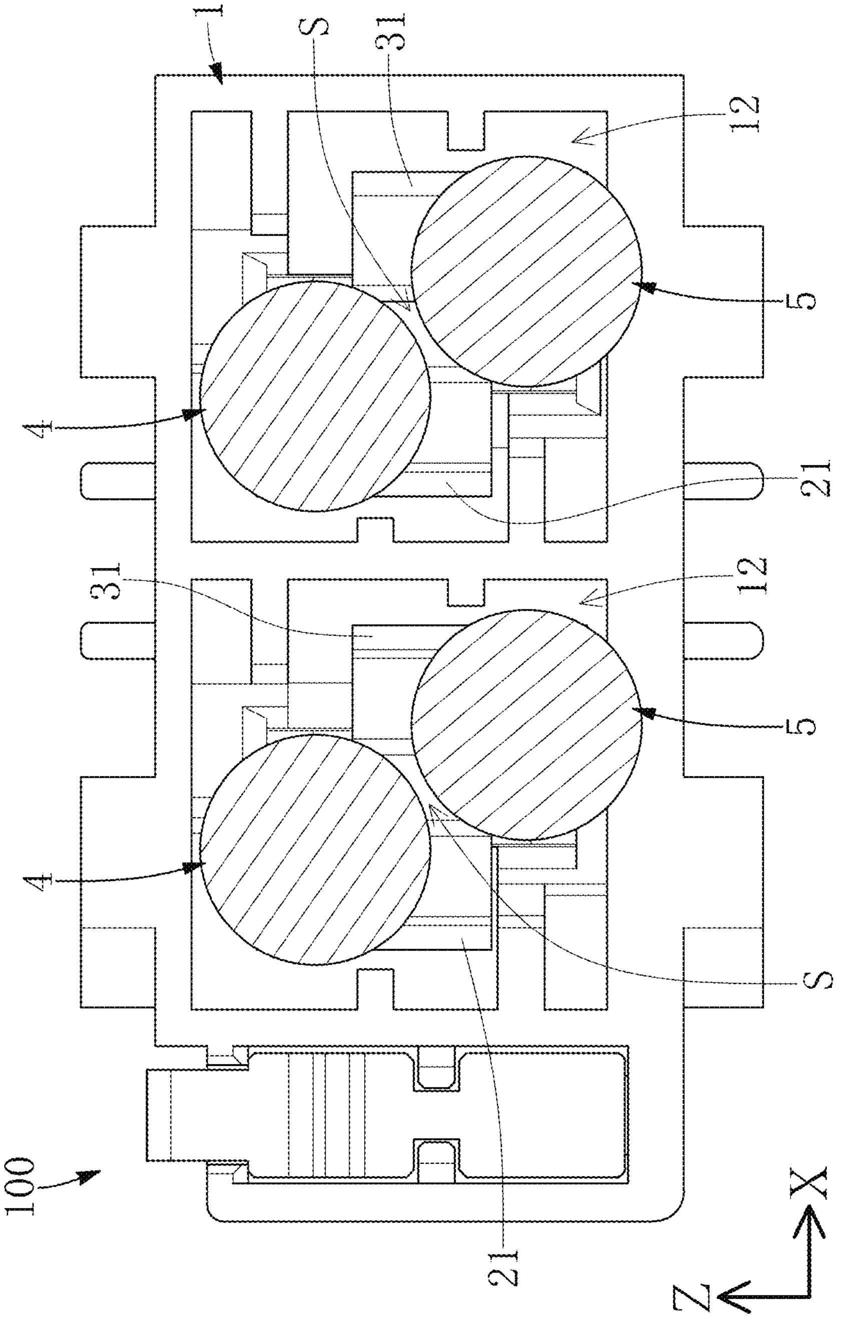
FIG. 8 is a schematic back view of the connector according to the first embodiment of the present disclosure.
Figure 9:
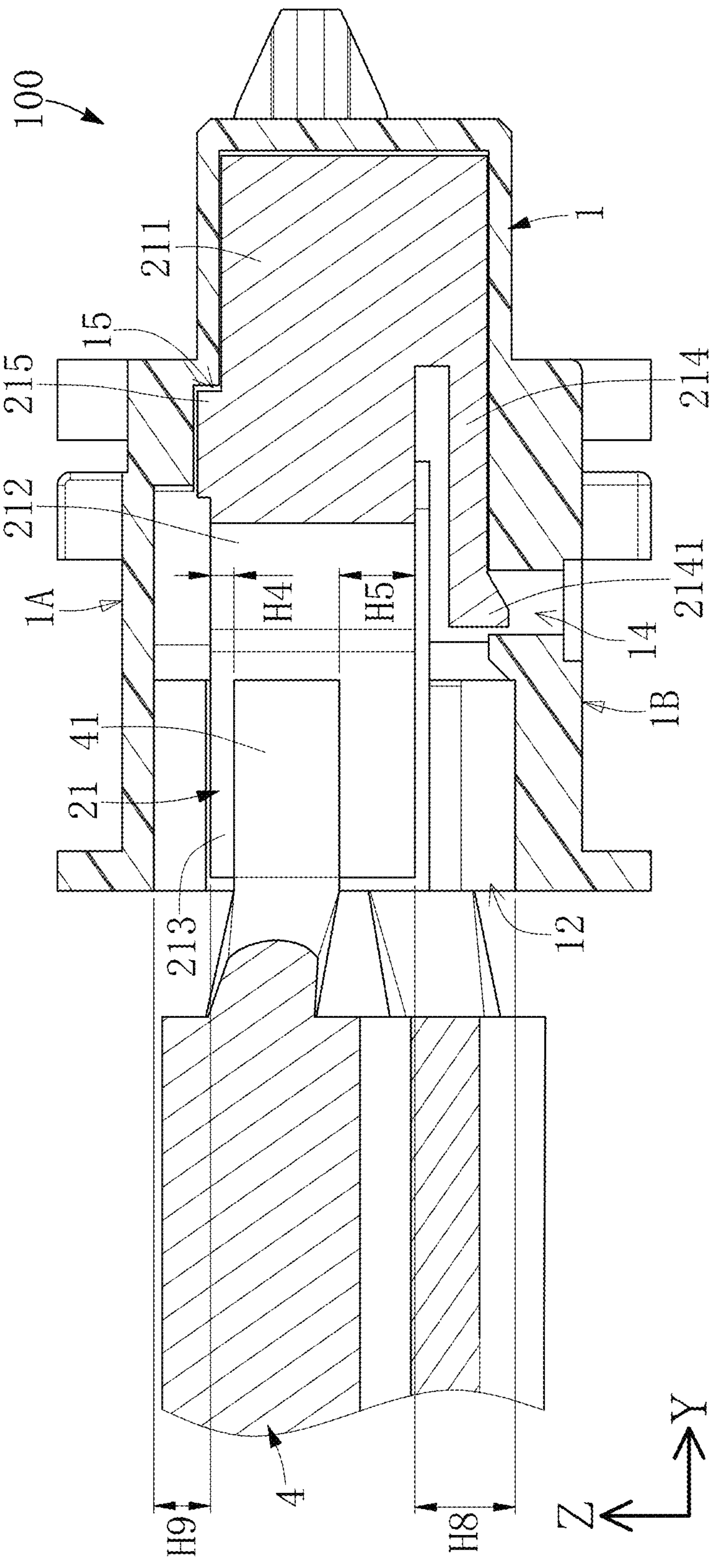
FIG. 9 is a schematic cross-sectional view taken along line IX-IX of FIG. 4.
Figure 10:
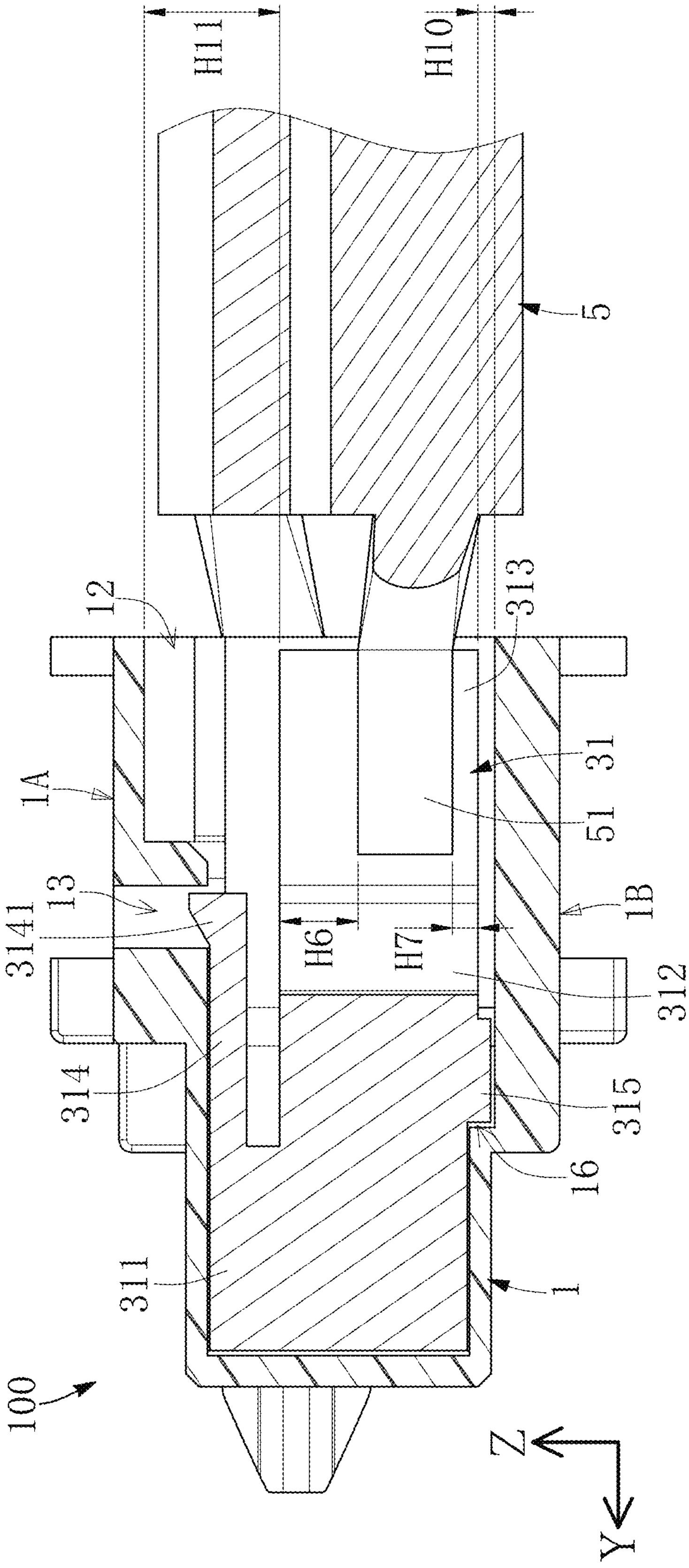
FIG. 10 is a schematic cross-sectional view taken along line X-X of FIG. 2.

As shown in FIG. 5 to FIG. 10, FIG. 5 is a schematic exploded view of the connector according to the first embodiment of the present disclosure, FIG. 6 is a schematic cross-sectional view taken along line VI-VI of FIG. 2, FIG. 7 is a schematic cross-sectional view taken along line VII-VII of FIG. 2, FIG. 8 is a schematic back view of the connector according to the first embodiment of the present disclosure, FIG. 9 is a schematic cross-sectional view taken along line IX-IX of FIG. 4, and FIG. 10 is a schematic cross-sectional view taken along line X-X of FIG. 2.

Each of the two connection terminal assemblies 200 includes two conductive components and two cables. The two conductive components are respectively a first conductive component 2 and a second conductive component 3. The two cables are respectively a first cable 4 and a second cable 5. The first conductive component 2 is electrically connected to the first cable 4, and at least part of the first conductive component 2 is disposed in the insulating body 1. The second conductive component 3 is electrically connected to the second cable 5, and at least part of the second conductive component 3 is disposed in the insulating body 1. The at least part of the first conductive component 2 and the at least part of the second conductive component 3 of each of the two connection terminal assemblies 200 are arranged in one of the terminal slots 12.

As shown in FIG. 5 to FIG. 7, the first conductive component 2 includes a first conductive sheet 21 that is a sheet-like structure. The first conductive sheet 21 includes a first contacting portion 211, a first bending portion 212, and a first connecting portion 213. Two ends of the first bending portion 212 are respectively connected to the first contacting portion 211 and the first connecting portion 213. The first contacting portion 211, the first bending portion 212, and the first connecting portion 213 are integrally formed as a single one-piece structure. In practice, the first conductive component 2 can be produced to have the first contacting portion 211, the first bending portion 212, and the first connecting portion 213 formed in a single stamping process.

The second conductive component 3 includes a second conductive sheet 31 that is a sheet-like structure. The second conductive sheet 31 includes a second contacting portion 311, a second bending portion 312, and a second connecting portion 313. Two ends of the second bending portion 312 are respectively connected to the second contacting portion 311 and the second connecting portion 313. A description of the second contacting portion 311, the second bending portion 312, and the second connecting portion 313 are the same as the aforementioned description of the first contacting portion 211, the first bending portion 212, and the first connecting portion 213, and will not be further described herein for the sake of brevity.

The first contacting portion 211 and the second contacting portion 311 of each of the two connection terminal assemblies 200 are arranged in one of the terminal slots 12 of the insulating body 1, the first connecting portion 213 and the second connecting portion 313 are electrically connected to the first cable 4 and the second cable 5, respectively. The first cable 4 and the second cable 5 are staggeringly arranged with each other along an up and down direction (e.g., a Z-axis). In other words, a connection area between the first connecting portion 213 and the first cable 4 and a connection area between the second connecting portion 313 and the second cable 5 are arranged to be staggered up and down with each other. The first bending portion 212 has a displacement relative to a side of the first contacting portion 211, so that the first contacting portion 211 and the first connecting portion 213 can be respectively arranged in two planes substantially parallel to each other. The second bending portion 312 has a displacement relative to a side of the second contacting portion 311, and the second contacting portion 311 and the second connecting portion 313 can be arranged in two substantially parallel planes.

As shown in FIG. 7, when the first conductive component 2 and the second conductive component 3 of any one of the connection terminal assemblies 200 are fixedly disposed in the insulating body 1, the first contacting portion 211 and the second contacting portion 311 in one of the terminal slots 12 face toward each other (along an X-axis), the first bending portion 212 and the second bending portion 312 face toward each other, and the first connecting portion 213 and the second connecting portion 313 face toward each other. Furthermore, a distance H1 between the first contacting portion 211 and the second contacting portion 311 is less than a distance H2 between the first connecting portion 213 and the second connecting portion 313, and a distance H3 between the first bending portion 212 and the second bending portion 312 gradually increases from one end of the first bending portion 212 adjacent to the first contacting portion 211 toward another end of the first bending portion 212 adjacent to the connecting portion 213. The first contacting portion 211 and the second contacting portion 311 of any one of the connection terminal assemblies 200 are jointly in contact with a docking terminal assembly 8 of the docking connector 300. A space between the first connecting portion 213 and the second connecting portion 313 is provided for accommodating a first conductive connector 41 of the first cable 4 and a second conductive connector 51 of the second cable 5. The first conductive connector 41 and the second conductive connector 51 are fixedly connected to an inner surface of the first connecting portion 213 and an inner surface of the second connecting portion 313, respectively, in a welding manner or an ultrasonic manner.

As shown in FIG. 6 and FIG. 8, the first conductive connector 41 and the second conductive connector 51 are respectively arranged adjacent to an upper edge 1A and a lower edge 1B of the insulating body 1 and are arranged to be staggered up and down with each other, so that the first cable 4 and the second cable 5 connected to the first conductive component 2 and the second conductive component 3 are diagonally arranged with each other for allowing a space between the first cable 4 and the second cable 5 to be increased, thereby forming a larger heat-dissipation gap S between the first cable 4 and the second cable 5. Accordingly, when the first conductive component 2, the first cable 4, the second conductive component 3, and the second cable 5 transmit a larger current and generate a larger amount of thermal energy (e.g., heat), the heat can be effectively dissipated through the heat-dissipation gap S.

It should be noted that the connector 100 of the present disclosure can be provided for improving the heat dissipation of the two cables without changing an existing size thereof when the connector 100 transmits a large current.

Reference is made to FIG. 4, FIG. 5, FIG. 9, and FIG. 10. FIG. 9 is a schematic cross-sectional view taken along line IX-IX of FIG. 4 and FIG. 10 is a schematic cross-sectional view taken along line X-X of FIG. 2. As shown in FIG. 2, FIG. 5, and FIG. 9, in practice, the first conductive component 2 further includes a first elastic engaged arm 214. One end of the first elastic engaged arm 214 is connected to the first contacting portion 211, and another end of the first elastic engaged arm 214 is a free end including a first engaging protrusion 2141. In the present embodiment, the first elastic engaged arm 214 and the first bending portion 212 are respectively connected to an upper side and a lower side of an end of the first contacting portion 211.

During a process implemented for fixedly placing the first conductive component 2 into the insulating body 1, the first elastic engaged arm 214 can be elastically deformed. When the first conductive component 2 is fixedly disposed in the insulating body 1, the first engaging protrusion 2141 can be correspondingly engaged in a first engaged hole 13 of the insulating body 1. The first engaged hole 13 is a through hole penetrating through the insulating body 1, and the first engaged hole 13 is in spatial communication with the terminal slot 12.

Through a design of the first engaging protrusion 2141 and the first engaged hole 13, when the first conductive component 2 is fixedly disposed in the insulating body 1, a user can insert relevant tools (e.g., a flat-blade screwdriver) into the first engaged hole 13 to push a first elastic engaged arm 214, so that the first elastic engaged arm 214 is elastically deformed along a direction toward the first connecting portion 213. Accordingly, the first elastic engaged arm 214 is not engaged in the first engaged hole 13, and the user can pull out the first conductive component 2 and the first cable 4 from the insulating body 1.

Furthermore, the first conductive component 2 further includes a first auxiliary positioning portion 215. The first auxiliary positioning portion 215 is a protruding structure that is formed by extending outward from a side of the first contacting portion 211 adjacent to the first bending portion 212. The first auxiliary positioning portion 215 and the first elastic engaged arm 214 can be arranged on two opposite sides of the first conductive component 2. As shown in FIG. 9, when the first conductive component 2 is fixedly disposed in the insulating body 1, the first auxiliary positioning portion 215 and a first body positioning portion 15 (e.g., a groove) of the insulating body 1 abut against each other, and the first auxiliary positioning portion 215 and the first body positioning portion 15 jointly limit a movable range of the first conductive component 2 relative to the insulating body 1 along a Y-axis.

Furthermore, through a design of the first auxiliary positioning portion 215 and the first body positioning portion 15, during the process implemented for assembling the first conductive component 2 into the insulating body 1 by the user, when the first auxiliary positioning portion 215 abuts against the first body positioning portion 15, the user can clearly feel that the first conductive component 2 has been inserted to a certain position into the insulating body 1. At this time, through the first engaged hole 13, the user can observe the first engaging protrusion 2141 has been engaged in the first engaged hole 13, so that the user can ensure that the first conductive component 2 has been correctly assembled in the insulating body 1.

Similarly, as shown in FIG. 4, FIG. 5, and FIG. 10, the second conductive component 3 further includes a second elastic engaged arm 314 and a second auxiliary positioning portion 315. The insulating body 1 further includes a second body positioning portion 16. One end of the second elastic engaged arm 314 is connected to the second contacting portion 311, and another end of the second elastic engaged arm 314 is a free end including a second engaging protrusion 3141. The insulating body 1 further includes a second engaged hole 14, and the second engaged hole 14 and the first engaged hole 13 are respectively disposed on an upper surface and a lower surface of the insulating body 1. A description of the second elastic engaged arm 314, the second engaging protrusion 3141, the second engaged hole 14, the second auxiliary positioning portion 315, and the second body positioning portion 16 are the same as the aforementioned description of the first elastic engaged arm 214, the first engaging protrusion 2141, the first engaged hole 13, and the first auxiliary positioning portion 215, and will not be further described herein for the sake of brevity. Furthermore, the first engaged hole 13 and the second engaged hole 14 are arranged on two opposite sides of the insulating body 1. That is to say, the first elastic engaged arm 214 of the first conductive component 2 and the second elastic engaged arm 314 of the second conductive component 3 installed in the insulating body 1 are staggeringly arranged with each other along the up and down direction (e.g., the Z-axis). For example, as shown in FIG. 4, the first elastic engaged arm 214 is arranged at the lower side of the end of the first contacting portion 211 (at this time, the first bending portion 212 is arranged above the end of the first contacting portion 211), and the second elastic engaged arm 314 is arranged at an upper side of an end of the second contacting portion 311 (at this time, the second bending portion 312 is arranged below the end of the second contacting portion 311).

In practice, it is worth mentioning that the first conductive component 2 and the second conductive component 3 are not only being respectively engaged in the first engaged hole 13 and the second engaged hole 14 of the insulating body 1 through the first engaging protrusion 2141 and the second engaging protrusion 3141 so as to be fixed in the insulating body 1, but also the first conductive component 2, the second conductive component 3, and the insulating body 1 can be designed through the size, shape, slot, etc., for enabling the first conductive component 2 and the second conductive component 3 to be fixedly disposed in the insulating body 1, respectively, in a tightly fitting manner or a position limiting manner. Accordingly, the movable range of the first conductive component 2 and the second conductive component 3 relative to the insulating body 1 along any directions (e.g., the direction of X axis, Y-axis, and Z-axis, etc.) is limited.

As shown in FIG. 5, FIG. 8, FIG. 9, and FIG. 10, one end of the first cable 4 includes the first conductive connector 41 (e.g., a plurality of core wires provided without outer insulation layers) that can be connected to the first conductive component 2 in a welding manner or an ultrasonic welding manner. Similarly, one end of the second cable 5 includes the second conductive connector 51 that can be connected to the second conductive component 3 in the welding manner or the ultrasonic welding manner.

As shown in FIG. 9, the first conductive connector 41 is disposed adjacent to an upper edge of the first conductive component 2. That is to say, a straight-line distance H4 between an upper edge of the first conductive connector 41 and the upper edge of the first conductive component 2 is less than a straight-line distance H5 between a lower edge of the first conductive connector 41 and a lower edge of the first conductive component 2.

Furthermore, a width of the first connecting portion 213 of the first conductive component 2 is less than a width of the terminal slot 12, the first connecting portion 213 is disposed adjacent to a side of the terminal slot 12, so that a distance H8 between a lower inner surface of the first connecting portion 213 and a lower inner surface of the terminal slot 12 is greater than a distance H9 between an upper inner surface of the first connecting portion 213 and an upper inner surface of the terminal slot 12.

As shown in FIG. 10, the second conductive connector 51 is disposed adjacent to a lower edge of the second conductive component 3. That is to say, a straight-line distance H6 between an upper edge of the second conductive connector 51 and an upper edge of the second conductive component 3 is greater than a straight-line distance H7 between a lower edge of the second conductive connector 51 and the lower edge of the second conductive component 3. Furthermore, a width of the second connecting portion 313 of the second conductive component 3 is less than the width of the terminal slot 12, the second connecting portion 313 is disposed adjacent to the side of the terminal slot 12, so that a distance H10 between a lower inner surface of the second connecting portion 313 and the lower inner surface of the terminal slot 12 is less than a distance H11 between an upper inner surface of the second connecting portion 313 and the upper inner surface of the terminal slot 12. In other words, the first connecting portion 213 and the second connecting portion 313 arranged in one of the terminal slots 12 are arranged to be staggered up and down with each other.

Accordingly, through a design of the first conductive connector 41 that is disposed adjacent to the upper edge of the first conductive component 2 and a design of the second conductive connector 51 that is disposed adjacent to the lower edge of the second conductive component 3, the heat-dissipation gap S between the first cable 4 and the second cable 5 can be effectively maximized.

Figure 11:
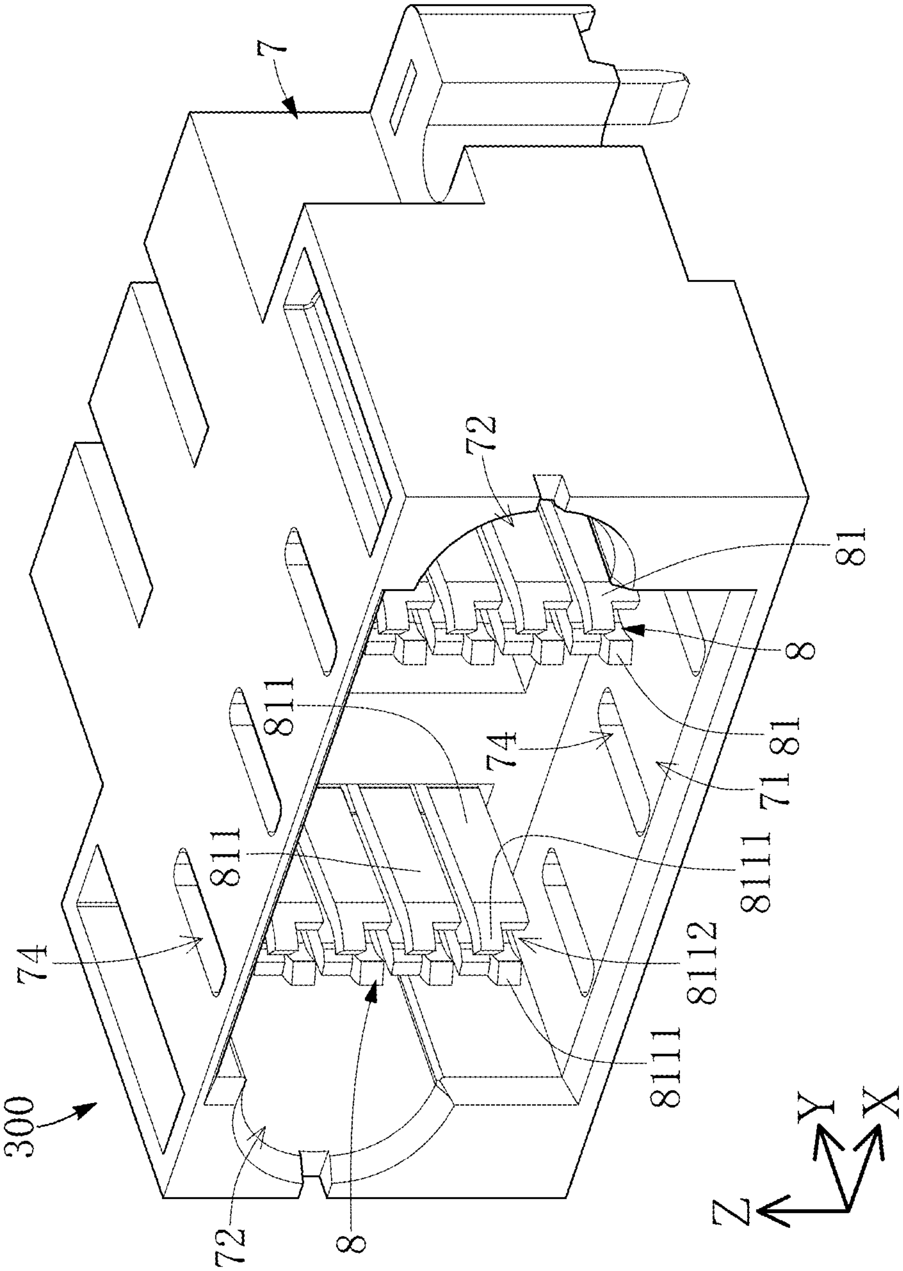
FIG. 11 is a schematic view of the docking connector according to the present disclosure.
Figure 12:
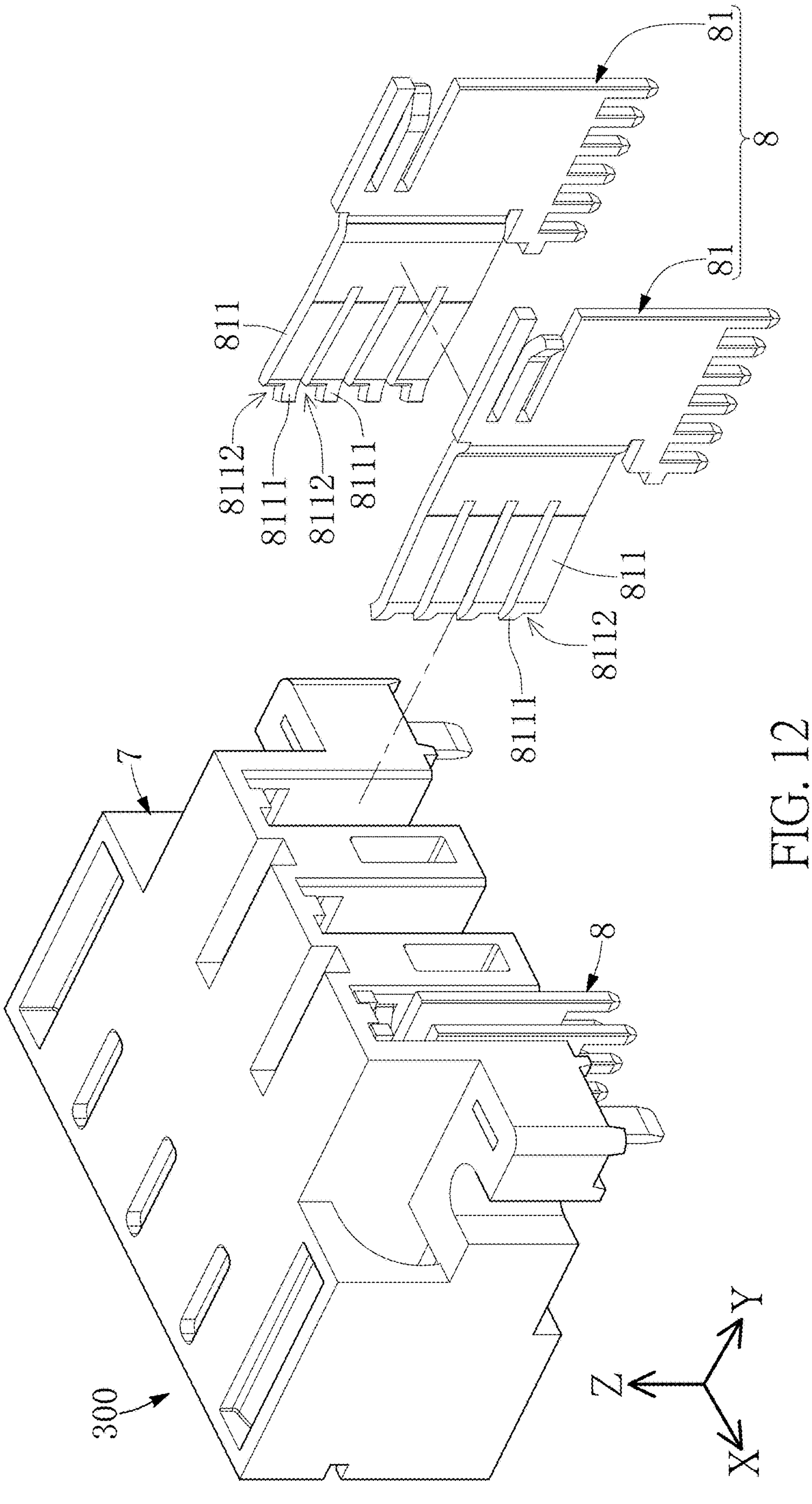
FIG. 12 is a schematic exploded view of the docking connector according to the present disclosure.
Figure 13:
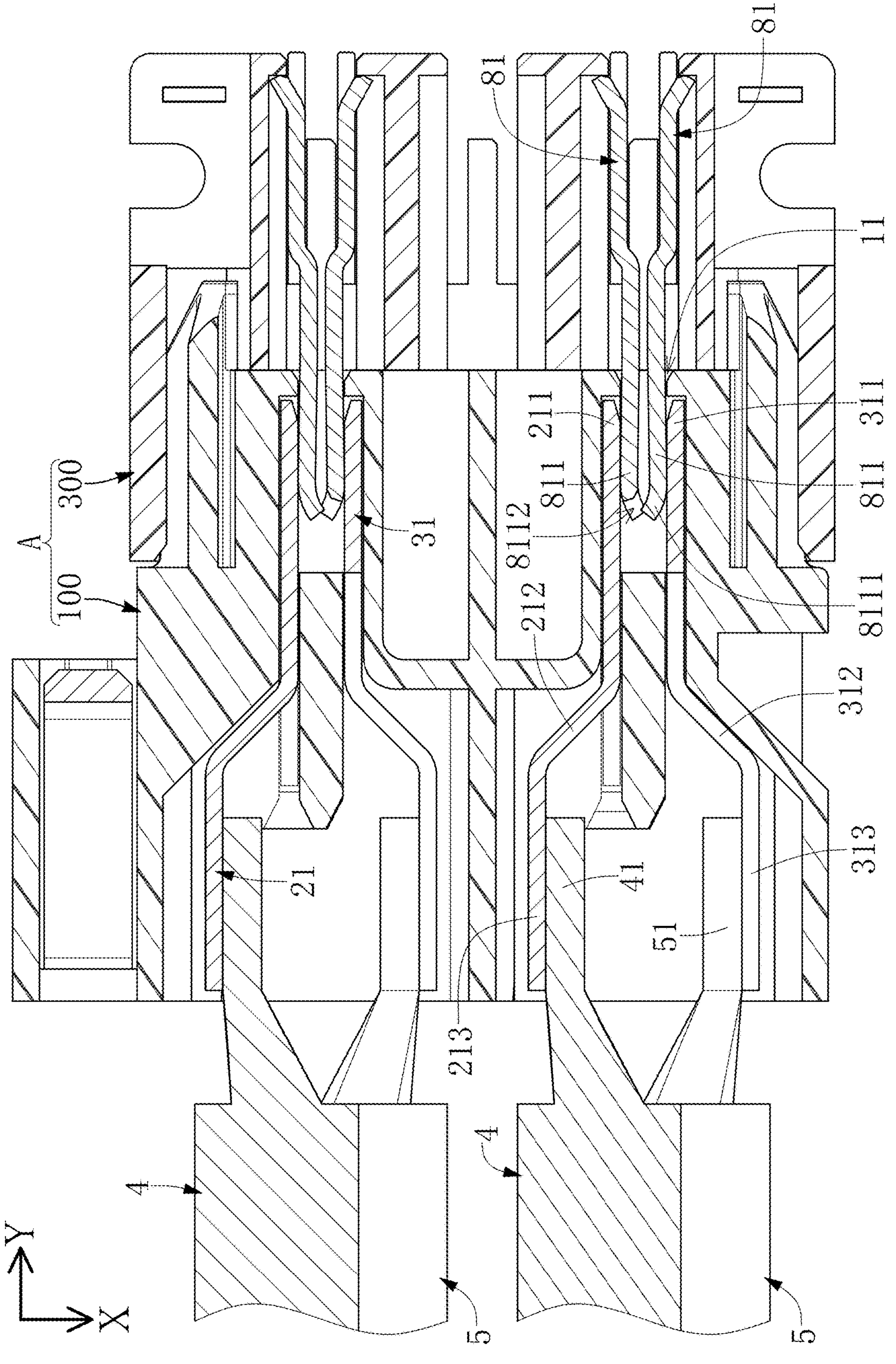
FIG. 13 is a schematic cross-sectional view taken along line XIII-XIII of FIG. 1.

As shown in FIG. 11 to FIG. 13, FIG. 11 is a schematic view of the docking connector of the present disclosure, FIG. 12 is a part of a schematic exploded view of the docking connector of the present disclosure, and FIG. 13 is a schematic cross-sectional view taken along line XIII-XIII of FIG. 1.

The docking connector 300 is a board connector including an insulating body 7 and at least one docking terminal assembly 8. The insulating body 7 includes a terminal slot 71. In the present embodiment, a quantity of the at least one docking terminal assembly 8 can be multiple, each of the docking terminal assemblies 8 can include two docking conductive sheets 81, and one side of each of the two docking conductive sheets 81 can have a plurality of elastic arms 811 that are arranged in the terminal slot 71. When the docking connector 300 is connected to the connector 100, each of a left side and a right side of the terminal slot 71 has a guide slot 72 that is configured to accommodate one of the guide columns 18 of the connector 100, and an upper side and a lower side of the terminal slot 71 have at least one heat-dissipation opening 74. In any one of the docking terminal assemblies 8, the elastic arms 811 of the two docking conductive sheets 81 face toward each other, and tail ends of the elastic arms 811 of one of the two docking conductive sheets 81 and the tail ends of the elastic arms 811 of another one of the two docking conductive sheets 81 are inwardly bent, and each of the tail ends of the elastic arms 811 has a protrusion 8111 and a notch 8112. In any one of the docking terminal assemblies 8, the protrusions 8111 of one of the two docking conductive sheets 81 respectively face toward the notches 8112 of the elastic arms 811 of another one of the two docking conductive sheets 81.

As shown in FIG. 13, when the connector 100 and the docking connector 300 are mated with each other, the two docking conductive sheets 81 of each of the docking terminal assemblies 8 are inserted into one of the connection openings 11 and are in contact with the two conductive sheets (e.g., the first conductive sheet 21 and the second conductive sheet 31) of the one of the connection openings 11, and the elastic arms 811 of each of the two docking conductive sheets 81 are elastically deformed.

Accordingly, since the protrusions 8111 of one of the two docking conductive sheets 81 are designed to respectively face toward the notches 8112 of another one of the two docking conductive sheets 81, during the process implemented for mating the connector 100 and the docking connector 300 with each other, the docking terminal assemblies 8 are pushed and elastically deformed, so that the protrusions 8111 and the notches 8112 thereof are moved toward each other. Accordingly, an elastic deformation space and a deformation amount of the two docking conductive sheets 81 are increased, so that each of the two docking conductive sheets 81 can provide a greater normal force.

Second Embodiment

Figure 14:
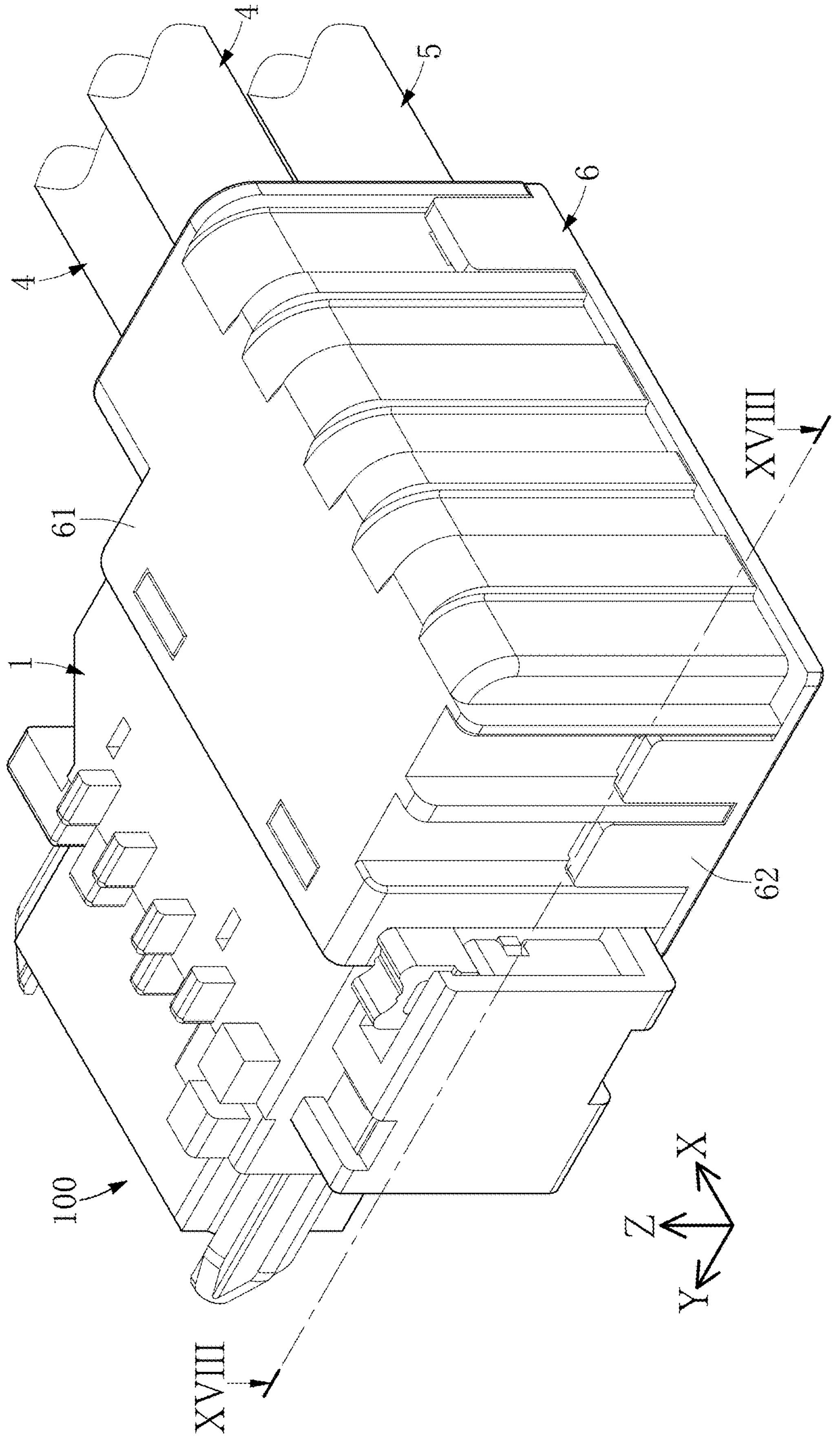
FIG. 14 and FIG. 15 are schematic views of the connector from different angles of view according to a second embodiment of the present disclosure.
Figure 15:
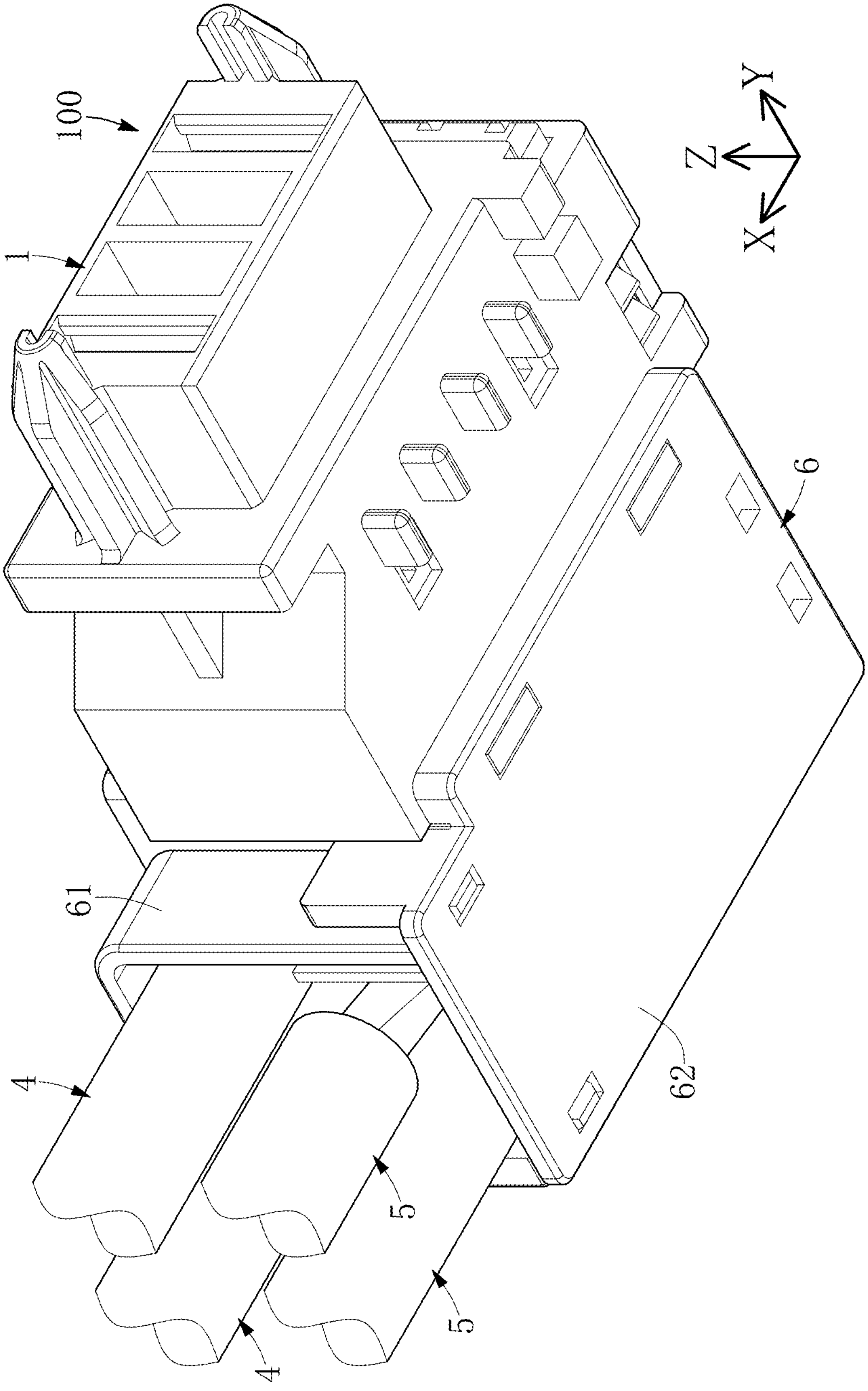
Figure 16:
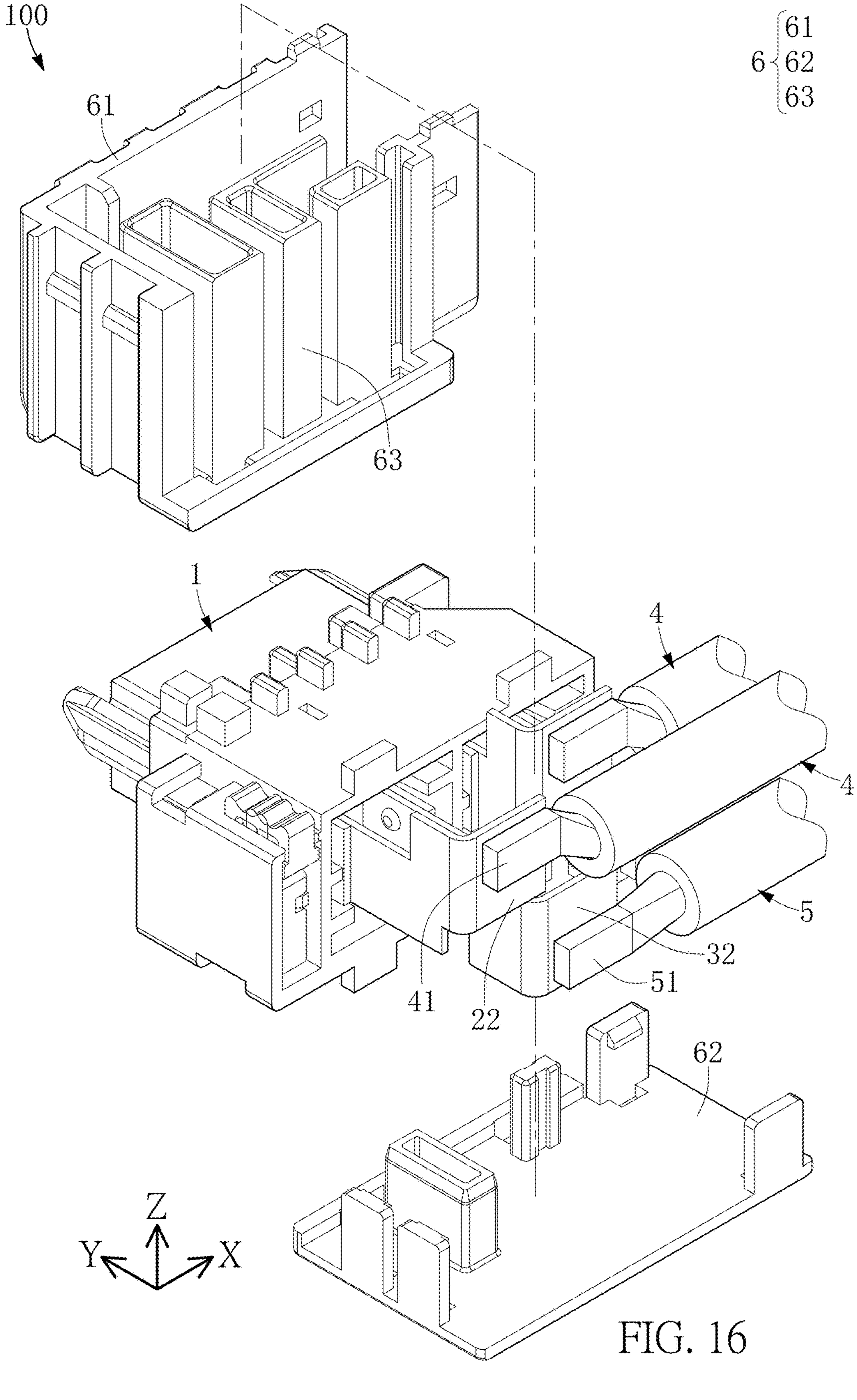
FIG. 16 is a schematic exploded view of the connector according to the second embodiment of the present disclosure.
Figure 17:
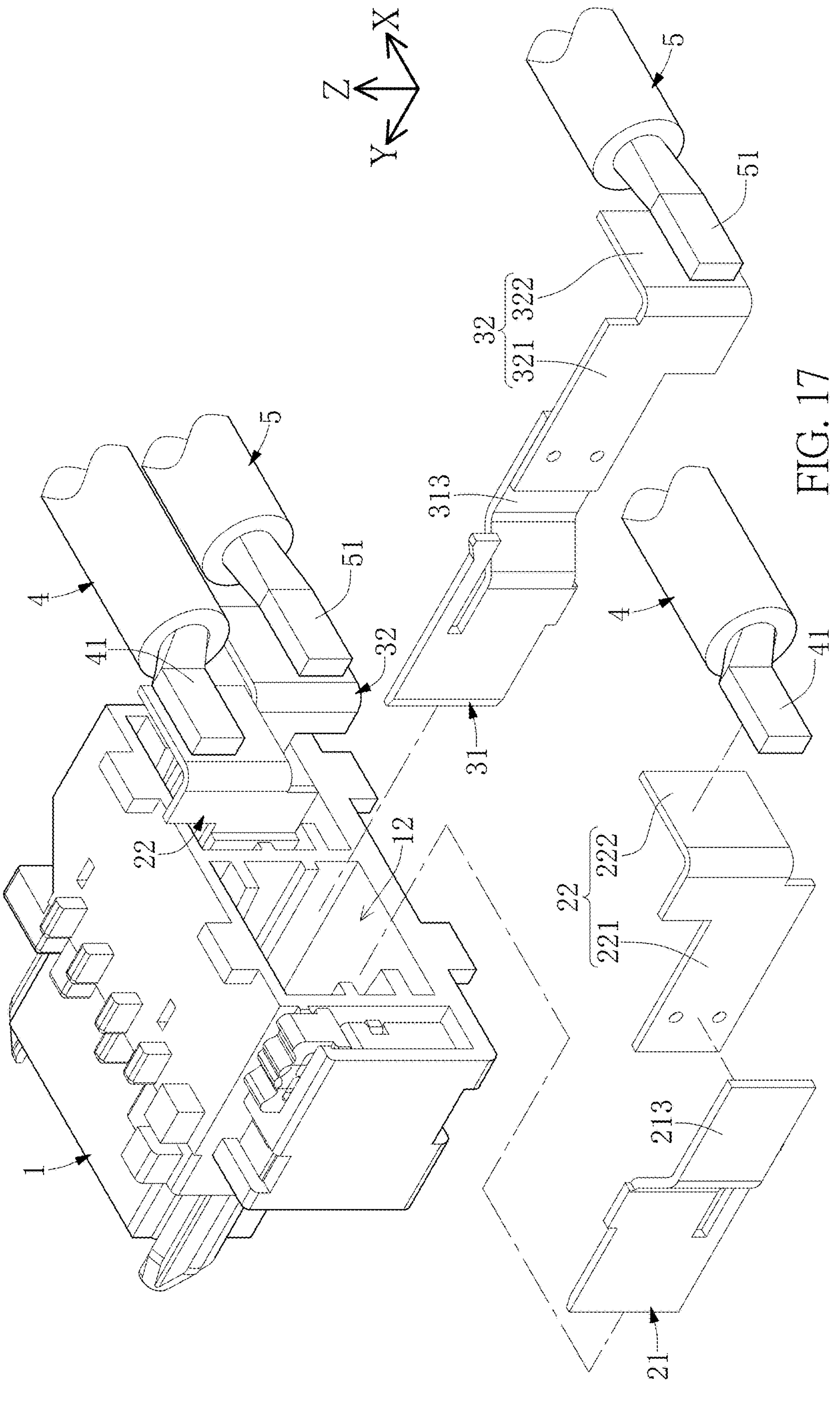
FIG. 17 is a schematic exploded view of a part of the connector according to the second embodiment of the present disclosure.
Figure 18:
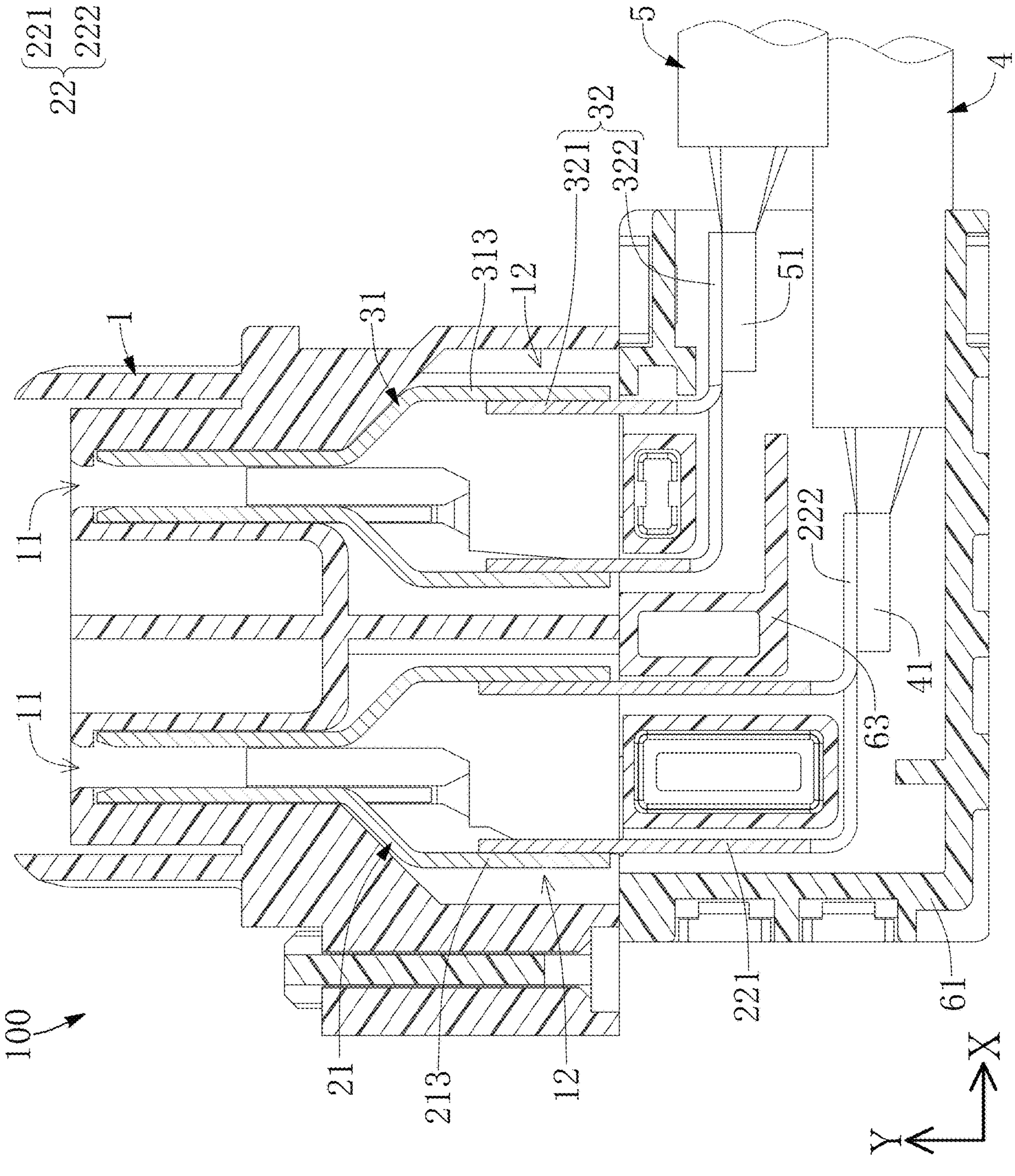
FIG. 18 is a schematic cross-sectional view taken along line XVIII-XVIII of FIG. 14.

Referring to FIG. 14 to FIG. 18, FIG. 14 and FIG. 15 are schematic views of the connector from different angles of view according to a second embodiment of the present disclosure, FIG. 16 is a schematic exploded view of the connector according to the second embodiment of the present disclosure, FIG. 17 is a schematic exploded view of a part of the connector according to the second embodiment of the present disclosure, and FIG. 18 is a schematic cross-sectional view taken along line XVIII-XVIII of FIG. 14.

A difference between the present embodiment and the aforementioned embodiment is an outgoing line direction of the cables of the connector 100. In the present embodiment, an outgoing line direction (e.g., the X-axis in FIG. 14) of the connector 100 is different from a plug-in direction (e.g., the Y-axis in FIG. 14) of the connector 100. In the aforementioned embodiment, the outgoing line direction of the connector 100 is similar to the plug-in direction of the connector 100. Naturally, the outgoing line direction of the connector 100 can be an upward direction, a downward direction, a left direction, a right direction, or any directions relative to the plug-in direction according to practical requirements.

In the present embodiment, the connector 100 further includes an insulating cover 6. The insulating cover 6 includes a first cover body 61 and a second cover body 62. Moreover, a part of the first cover body 61 and a part of the second cover body 62 are detachably fixed with each other and then engaged with the insulating body 1.

As shown in FIG. 17, the first conductive component 2 and the second conductive component 3 respectively include a first transition sheet 22 and a second transition sheet 32. The first transition sheet 22 of the first conductive component 2 includes a first fixed section 221 and a second fixed section 222, the first fixed section 221 is fixed to the first connecting portion 213 of the first conductive sheet 21, and the second fixed section 222 is configured to be electrically connected to the first cable 4. In the present embodiment, the first fixed section 221 and the second fixed section 222 are sheet-like structures and a longitudinal direction of the first fixed section 221 is different from a longitudinal direction of the second fixed section 222. Specifically, the first transition sheet 22 may be substantially presented as an L-shaped sheet-like structure. Through an arrangement of the first transition sheet 22, the outgoing line direction of the first cable 4 can be changed. Similarly, the second transition sheet 32 is configured to be connected to the second conductive component 3 and the second cable 5 for changing the outgoing line direction of the second cable 5. A description of a first fixed section 321 and a second fixed section 322 included by the second transition sheet 32 is the same as the aforementioned description of the first fixed section 221 and the second fixed section 222 of the first transition sheet 22, and will not be further described herein for the sake of brevity. In other embodiments, the first conductive sheet 21 and the first transition sheet 22 can be integrally formed as a single one-piece structure, and the second conductive sheet 31 and the second transition sheet 32 can also be integrally formed as a single one-piece structure. That is to say, the first connecting portion 213 of the first conductive sheet 21 includes the first transition sheet 22 so as to be an L-shaped structure, and the second connecting portion 313 of the second conductive sheet 31 includes the second transition sheet 32 so as to be an L-shaped structure. As shown in FIG. 16, when the first transition sheet 22 and the second transition sheet 32 are bent in a same direction (e.g., a positive X-axis direction), the first transition sheet 22 and the second transition sheet 32 can be staggeringly arranged with each other along the up and down direction (e.g., the Z-axis), so that the first transition sheet 22 and the second transition sheet 32 can avoid contacting each other.

The insulating cover 6 is configured to shield the transition sheets for enabling the transition sheets to not be exposed from the insulating cover 6. In practice, the insulating cover 6 further includes a plurality of isolation structures 63. Each of the isolation structures 63 is configured to isolate the transition sheets (e.g., the first transition sheet 22 and the second transition sheet 32) of the two docking conductive sheets 81 adjacent to each other.

Accordingly, since the first cover body 61 and the second cover body 62 are detachably connected to the insulating body 1, the user can decide whether to assemble the insulating cover 6 to the insulating body 1 according to actual requirements of outgoing lines. Correspondingly, when the user wants to change an original configuration of the outgoing lines, the user can directly remove/install the insulating cover 6 and replace the corresponding conductive components, thereby quickly changing the outgoing line direction of the connector 100.

Beneficial Effects of the Embodiments

In conclusion, in the connector and the connector assembly of the present disclosure, through the cables that are connected to the two conductive components of each of the connector terminal assemblies being arranged to be staggered up and down with each other and being respectively disposed adjacent to the upper edge and lower edge of the insulating body, the heat-dissipation gap can be formed between two of the cables, thereby effectively improving the heat dissipation effect and the current carrying capacity of the connector.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A connector, comprising:
an insulating body including at least one terminal slot and at least one connection opening, wherein the at least one connection opening is arranged on a docking end of the insulating body, the at least one terminal slot is arranged in the insulating body, and the at least one terminal slot is in spatial communication with the at least one connection opening;
at least one connection terminal assembly including two conductive components, wherein the two conductive components are disposed in the at least one terminal slot; and
at least two cables, wherein the at least two cables are electrically connected to the two conductive components, respectively, and the at least two cables are staggeringly arranged with each other;
wherein the at least two cables include a first cable and a second cable, and wherein the two conductive components of the at least one connection terminal assembly include a first conductive component and a second conductive component, an end of the first cable is connected to a part of the first conductive component that is adjacent to an upper edge of the first conductive component, and an end of the second cable is connected to a part of the second conductive component that is adjacent to a lower edge of the second conductive component.

2. A connector, comprising:
an insulating body including at least one terminal slot and at least one connection opening, wherein the at least one connection opening is arranged on a docking end of the insulating body, the at least one terminal slot is arranged in the insulating body, and the at least one terminal slot is in spatial communication with the at least one connection opening;
at least one connection terminal assembly including two conductive components, wherein the two conductive components are disposed in the at least one terminal slot; and
at least two cables, wherein the at least two cables are electrically connected to the two conductive components, respectively, and the at least two cables are staggeringly arranged with each other;
wherein each of the two conductive components includes a contacting portion, a connecting portion, and a bending portion that has two ends respectively connected to the contacting portion and the connecting portion, and wherein the two conductive components of the at least one connection terminal assembly in the at least one terminal slot face toward each other, the connecting portions of the two conductive components are electrically connected to the at least two cables, respectively, and a distance between the contacting portions of the two conductive components is less than a distance between the connecting portions of the two conductive components.

3. The connector according to claim 2, wherein each of the two conductive components further includes an elastic engaged arm, and wherein, in each of the two conductive components, the elastic engaged arm and the bending portion are respectively connected to an upper side and a lower side of an end of the contacting portion.

4. A connector, comprising:
an insulating body including at least one terminal slot and at least one connection opening, wherein the at least one connection opening is arranged on a docking end of the insulating body, the at least one terminal slot is arranged in the insulating body, and the at least one terminal slot is in spatial communication with the at least one connection opening;
at least one connection terminal assembly including two conductive components, wherein the two conductive components are disposed in the at least one terminal slot; and
at least two cables, wherein the at least two cables are electrically connected to the two conductive components, respectively, and the at least two cables are staggeringly arranged with each other;
wherein each of the two conductive components includes an elastic engaged arm, and an upper surface and a lower surface of the insulating body respectively have at least one first engaged hole and at least one second engaged hole, and wherein, when the two conductive components of the at least one connection terminal assembly are fixed in the insulating body, a part of the elastic engaged arm of one of the two conductive components is arranged in the at least one first engaged hole, and a part of the elastic engaged arm of another one of the two conductive components is arranged in the at least one second engaged hole.

5. A connector, comprising:
an insulating body including at least one terminal slot and at least one connection opening, wherein the at least one connection opening is arranged on a docking end of the insulating body, the at least one terminal slot is arranged in the insulating body, and the at least one terminal slot is in spatial communication with the at least one connection opening;
at least one connection terminal assembly including two conductive components, wherein the two conductive components are disposed in the at least one terminal slot; and
at least two cables, wherein the at least two cables are electrically connected to the two conductive components, respectively, and the at least two cables are staggeringly arranged with each other;
wherein each of the two conductive components is a sheet-like structure having a conductive sheet and a transition sheet, and each of the two conductive sheets is fixedly disposed in the insulating body, and wherein, in each of the two conductive components, the transition sheet is an L-shaped structure, one end of the transition sheet is connected to the conductive sheet, and another end of the transition sheet is electrically connected to a corresponding one of the at least two cables.

6. The connector according to claim 5, further comprising at least one insulating cover, wherein the at least one insulating cover includes a first cover body and a second cover body, a part of the first cover body and a part of the second cover body are detachably fixed to the insulating body, and the first cover body and the second cover body are detachably fixed with each other, and wherein the insulating cover is configured to shield the transition sheets of the two conductive components, so that the transition sheets of the two conductive components are not exposed.

7. The connector according to claim 6, wherein the insulating cover further includes a plurality of isolation structures, and each of the isolation structures is configured to isolate the transition sheets of the two conductive components adjacent to each other.

8. A connector assembly, comprising:

an insulating body including a terminal slot; and at least one docking terminal assembly, wherein the at least one docking terminal assembly includes two docking conductive sheets, one end of each of the two docking conductive sheets has a plurality of elastic arms arranged in the terminal slot, and wherein the elastic arms of the two docking conductive sheets of the at least one docking terminal assembly face toward each other, a tail end of each of the elastic arms has a protrusion and a notch, and each of the protrusions of any one of the elastic arms faces toward the notch of another one of the elastic arms.

9. The connector assembly according to claim 8, wherein, in the at least one docking terminal assembly, the tail ends of the elastic arms of one of the two docking conductive sheets and the tail ends of the elastic arms of another one of the two docking conductive sheets are inwardly bent.

* * * * *